(12) United States Patent
Aral et al.

(10) Patent No.: US 8,195,770 B1
(45) Date of Patent: *Jun. 5, 2012

(54) SYSTEM, METHOD AND COMPUTER PROGRAM PRODUCT FOR ASYNCHRONOUS MIRRORING

(75) Inventors: Ziya Aral, Pompano Beach, FL (US);
Roni Putra, Pompano Beach, FL (US);
Alistair Black, Monte Sereno, CA (US);
Yonjian Ren, Pompano Beach, FL (US);
Wenlei Mao, Pompano Beach, FL (US)

(73) Assignee: DataCore Software Corproration, Fort Lauderdale, FL (US)

( * ) Notice: Subject to any disclaimer, the term of this patent is extended or adjusted under 35 U.S.C. 154(b) by 148 days.

This patent is subject to a terminal disclaimer.

(21) Appl. No.: 12/659,429

(22) Filed: Mar. 9, 2010

Related U.S. Application Data

(63) Continuation of application No. 09/910,662, filed on Jul. 20, 2001, now Pat. No. 7,707,272.

(60) Provisional application No. 60/262,705, filed on Jan. 19, 2001.

(51) Int. Cl.
*G06F 15/16* (2006.01)
(52) U.S. Cl. .................. 709/219; 709/217; 709/218
(58) Field of Classification Search .................. 709/217, 709/218, 219
See application file for complete search history.

(56) References Cited

U.S. PATENT DOCUMENTS

| | | | |
|---|---|---|---|
| 5,673,382 A | 9/1997 | Cannon et al. | |
| 5,713,014 A | 1/1998 | Durflinger et al. | |
| 5,933,653 A | 8/1999 | Ofek | |
| 6,148,383 A | 11/2000 | Micka et al. | |
| 6,260,125 B1 | 7/2001 | McDowell | |
| 6,442,706 B1 | 8/2002 | Wahl et al. | |
| 6,502,205 B1 | 12/2002 | Yanai et al. | |
| 6,557,075 B1 | 4/2003 | Maher | |
| 6,823,336 B1 | 11/2004 | Srinivasan et al. | |
| 2001/0052058 A1 | 12/2001 | Ohran | |
| 2002/0199058 A1 | 12/2002 | Ofek | |

*Primary Examiner* — John Follansbee
*Assistant Examiner* — Nghi Tran
(74) *Attorney, Agent, or Firm* — Rader, Fishman & Grauer, PLLC

(57) ABSTRACT

Mirroring write operations from a local storage system to a remote storage system. Such mirroring comprises intercepting I/O transactions to a storage disk of the local storage system, identifying a series of write transactions to said storage disk from the intercepted I/O transactions, storing an exact copy of the series of write transactions within a series of files that are created on a file-system of the local storage system, and transmitting the series of files from the local storage system to the remote storage system to accommodate a reproduction at the remote storage system of the series of write transactions as issued to said storage disk of the local storage system.

17 Claims, 9 Drawing Sheets

Peer-to-Peer AIM (bi-directional)

SYSTEM, METHOD AND COMPUTER PROGRAM PRODUCT FOR ASYNCHRONOUS MIRRORING

CROSS REFERENCE TO RELATED APPLICATIONS

This is a continuation application of patent application Ser. No. 09/910,662, filed Jul. 20, 2001 now U.S. Pat. No. 7,707,272, which claims priority under 35 U.S.C. §119(e) from provisional application No. 60/262,705 entitled Method and Apparatus for Asynchronous Mirroring Using TCP/IP Internet Protocol of Ziya, Putra, Black, Ren and Mao, which was filed on Jan. 19, 2001, and which is herein incorporated by reference in its entirety.

BACKGROUND OF THE INVENTION

1. Field of the Invention

The invention generally relates to the mirroring of data between two separate locations. More specifically, the invention relates to a method and apparatus for asynchronously mirroring data between two separate locations.

2. Description of the Related Art

Mirroring data to a geographically separate location has always been the most reliable option for ensuring data availability and has also provided a method for archiving data. Mirroring the data from a local disk drive to another local disk drive on the same computer protects the data from any one local disk failure. Most conventional mirroring methods and systems mirror data within a local system. Local data replication, however, will not protect the data from a system failure or site catastrophe. Moreover, few conventional mirroring methods and systems offer data replication between systems that are not physically co-located.

Some conventional prior art mirroring methods and systems allow the mirroring of data between two geographically separate locations. Such systems attempt to provide the mirroring of data in a synchronous fashion. These methods require the use of very high-speed dedicated communication mediums between the two sites in order to achieve data coherency. This method results in systems requiring the deployment of specialized hardware and customized communication infrastructure, which make the cost implementation extremely expensive. As such, its use is limited to a few areas where these systems are closely managed to only mirror data that is the most critical. In these prior art methods and systems, the intelligence to perform the mirroring function is built into the hardware of the system and is cognizant of the communication medium it is using to mirror the data. When a write to disk is transacted, the data is placed onto the local disk, then processed for transmission and transmitted over the dedicated communication medium. When the data is received at the remote system, it is processed again, then written to the disk of the remote system. Thus, a write to the disk from an application includes a write to the local disk and to the remote disk before the write operation is complete and another mirror write can be performed. This can cause significant delay in performing large numbers of consecutive write operations because it is necessary for mirroring to complete before the write operation is complete.

FIG. 1 illustrates conventional prior art systems for mirroring the data between a local storage system 101 and a remote storage system 165 over a long distance. As shown, the primary local storage system includes an I/O controller 110 and a storage driver 120 for managing I/O to and from a local source device 125. In FIG. 1, the source device 125 is shown as being external to the local storage system 101 and may include any type of storage device such as a hard disk drive, a CD-Rom drive, a flash memory (such as an EEPROM) or the equivalent. It is understood that the source device 125 need not be external to the local storage system 101 but may, instead, be implemented directly within the local storage system 101—as in the case of a hard disk drive. The local storage system also preferably includes a target device 150, so that the local storage system can also operate as a remote storage system for another local storage system (not shown).

The local storage system 101 is coupled to a remote storage system 165 via a secure dedicated high-speed, hi-bandwidth line 103. Both the local storage system 101 and the remote storage system 165 are of the same type and operate using the same I/O instruction set. As shown, the remote storage system includes an I/O controller 170 and a storage driver 180 for managing I/O to and from a target device 185. In FIG. 1, the target device 185 is shown as being external to the remote storage system 165 and may be any type of storage device such as a hard disk drive, a CD-Rom drive, a flash memory (such as an EEPROM) or the equivalent. The remote storage system 165 also preferably includes a source device 190, such that the remote storage system 165 can also operate as a local storage system and have the data from its source device 190 mirrored on another remote storage system (not shown).

In the systems illustrated in FIG. 1, the components are highly specialized and are designed to perform a single function, namely, to mirror data synchronously between the two storage systems. The mechanism employed to achieve this one function is often proprietary and is dependent on the underlying hardware and prior knowledge of the medium of communication over which the systems are connected. There are several disadvantages to this type of synchronous mirroring.

Synchronous mirroring relies on one or more proprietary storage-oriented protocols. The protocol is designed specifically for the dedicated communication medium deployed. This lack of resiliency makes it difficult to take advantage of advances in long distance communications without redesigning the entire system.

Communication link failure or link congestion can result in a loss of mirror coherency. Depending on the kind of communication failure that occurs, the effects can vary from degradation of application performance to application failure. The former is a result of attempting to synchronize the mirrors concurrently with continued application I/O activity and the latter is a result of policies that cannot tolerate data mirroring incoherencies.

What is needed is a system and method for mirroring data that does not require the use of a proprietary protocol. Instead the system and method should adopt widely accepted and commonly used protocols such as TCP/IP. In addition, the components that form the storage systems for remote mirroring should also be based on commonly available hardware.

What is further needed is a system using the networking infrastructure of the day for mirroring data. This allows the underlying network infrastructure to be switched out or replaced without having to completely change the remote mirroring storage system in order to accommodate the underlying network change. Communication mediums from existing telephone lines to high-end state of the art communication mediums must be accommodated. The choice of mediums must be selectable based on the amount of data to be replicated, the degree and level of availability desired, and the economics of deploying remote mirroring. When deploying such systems, the most expensive component is always the recurring cost of the communication medium. This is always the most significant factor in the cost of data, cost of data availability, cost of system and the recurring cost of the medium equation. The Internet is a good example of a system that provides a function that is used universally and is available at all points of the cost curve based on the performance required. A similar approach is required for remote data mirroring.

SUMMARY OF THE INVENTION

One example of an embodiment of the present invention uses the standard IP protocol and the already-available Internet medium for data mirroring between local and remote storage systems. In a preferred embodiment, local and remote storage systems are created using the Windows operating system running on the ubiquitous PC and all of the peripheral components that can be connected to a PC: memories, disk drives and controllers, Ethernet, modems etc. The integration of these "off-the-shelf" components into storage systems for mirroring data remotely between the local and remote storage systems is accomplished by layering into the system the software of the present invention. In a preferred embodiment, the software of the present invention is system-based software, which is used for mirroring data between two geographically separate locations. A preferred embodiment of the software includes three components or modules: an AIM (Asynchronous IP Mirroring) driver, an AIM service coordinator and an AIM manager.

In a preferred embodiment, the AIM driver intercepts I/O operations to the local storage system and makes copies of the write transactions, encapsulating these copies of the write transactions into a series of files. Certain embodiments also intercept formatting command and partitioning, and similar commands that affect the use of contents of the disk or storage device and mirror these commands as well. Files sizes are predetermined and any number of write transactions may be encapsulated in a single file until the file is full. Once these files are created, they are stored onto a local file system at the local storage system and queued for transfer to a remote storage system where the data is to be mirrored. The number of remote storage systems to which the data is to be mirrored is user selectable and may vary. In a preferred embodiment, the AIM service coordinator transmits these files to any or all pre-specified remote storage systems connected to the local storage system and to which the data is to be mirrored. In a preferred embodiment, the particular destinations for each file having any number of write transaction may be user specified. Accordingly, a first file may be transmitted to one remote storage system for mirroring the write transactions in that first file; while a second file having different write transactions may be transmitted to a different remote storage location for mirroring those write transactions.

As these files are received at the remote storage location, they are placed into the file system of the remote storage system and the write transactions in these files are executed at the remote storage system asynchronously. Accordingly, write transactions at the local storage system are complete and separate from write transactions at the remote storage system and no waiting is required before another write transaction can be executed at the local storage system. This decouples the latencies associated with remote mirroring from the applications.

More specifically, the AIM service coordinator on the remote storage system detects the arrival of the files having the copies of the write transactions and accesses these files, storing them in a predetermined location on the file system of the remote storage system. The content of these files (exact copies of the write transactions issued at the local system) are then executed within the remote storage system as write transactions to the remote or destination disk drive, in exactly the same way as they would have occurred on the local storage system. Because the data to be mirrored are encapsulated as standard files, this allows for the transfer to occur by means of any of the several standard and commonly used file transfer methods and/or protocols, over networks of any type (e.g., the Internet). The various file transfer methods may include the TCP/IP transfer protocol, the FTP file transfer protocol, or any other similar commercially available transfer protocol. These file transfer systems differentiate themselves by their degrees of reliability, flexibility, security and ability to dynamically adapt to the underlying network infrastructure to optimize the use of the bandwidth available. These file transfer systems have proven themselves simply by their use in very large numbers and the volume of data that is being transferred using these systems.

In a preferred embodiment, the present invention is able to asynchronously mirror data between two geographically separate locations. Accordingly, the application generating the I/Os to the local storage system is completely separated from the remote mirroring function that is occurring and both are executing concurrently. This enables the application to behave predictably in its transaction with the local storage system without having to wait for the inherent latency needed to complete the mirroring. Accordingly, latencies, link failures, and data resynchronization between the two distantly connected storage systems are transparent to the applications.

In a preferred embodiment, the present invention provides real-time statistics about the coherency 'time-lag' between the I/Os to the local drive and the mirroring functions. AIM managers at the local and remote ends communicate statistics back and forth, including statistical information about the number of files created, the number of files transferred from the local end, the number received at the far end, and whether the write transactions at the far end have been completed. This information provides an indication of the data coherency between the local and remote storage systems as a function of real time. The coherency 'time-lag' is defined as the amount data encapsulated in files on the local storage systems not transferred yet to the remote storage system, the files in transit and the files on the remote system that have not been accessed and whose contents have not been re-driven as I/O transactions on the remote storage system. The coherency 'time-lag' is a function of bandwidth availability, link reliability, file transfer system and amount of write I/O transactions generated to the local storage system, all of which can be predicted and easily manipulated to meet the data coherency requirement constraints of an individual user.

One other AIM advantage is the encapsulation of the write I/O transactions as files. The encapsulation method lends itself to asynchronous processing of the data (write updates) at either or both ends of connection. This processing can occur concurrently and is independent of the applications generating I/Os and of the file transfer between the storage systems.

DETAILED DESCRIPTION OF THE INVENTION

In a preferred embodiment, the present invention is designed to operate in peer-to-peer DataCore Storage Domain Server (SDS) applications. However, it is understood that the present invention may be used for mirroring data for numerous applications, regardless of the data format.

Figure 1:
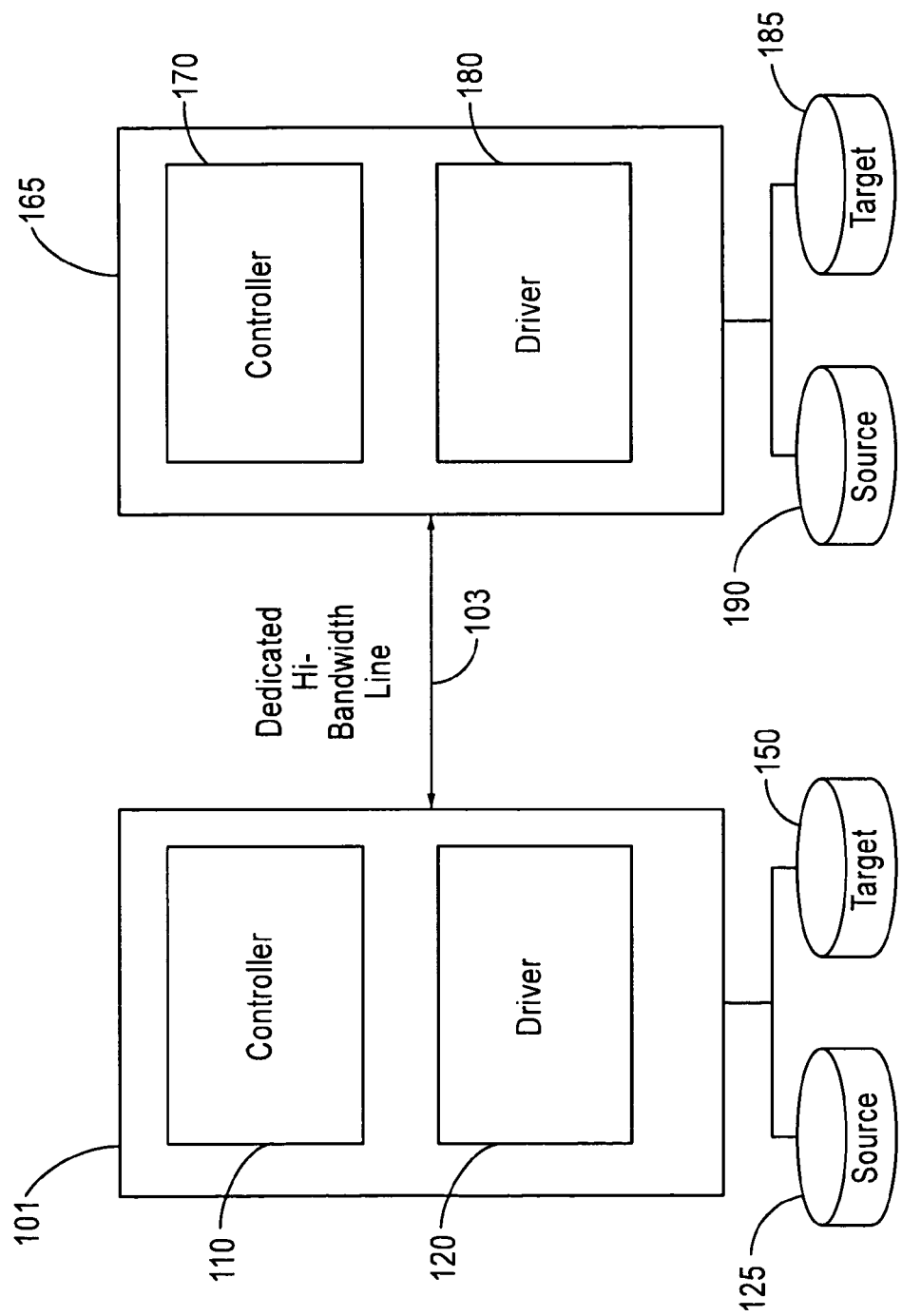
FIG. 1 illustrates a conventional prior art system for mirroring data between a primary local storage and a secondary remote storage over a long distance.
Figure 2:
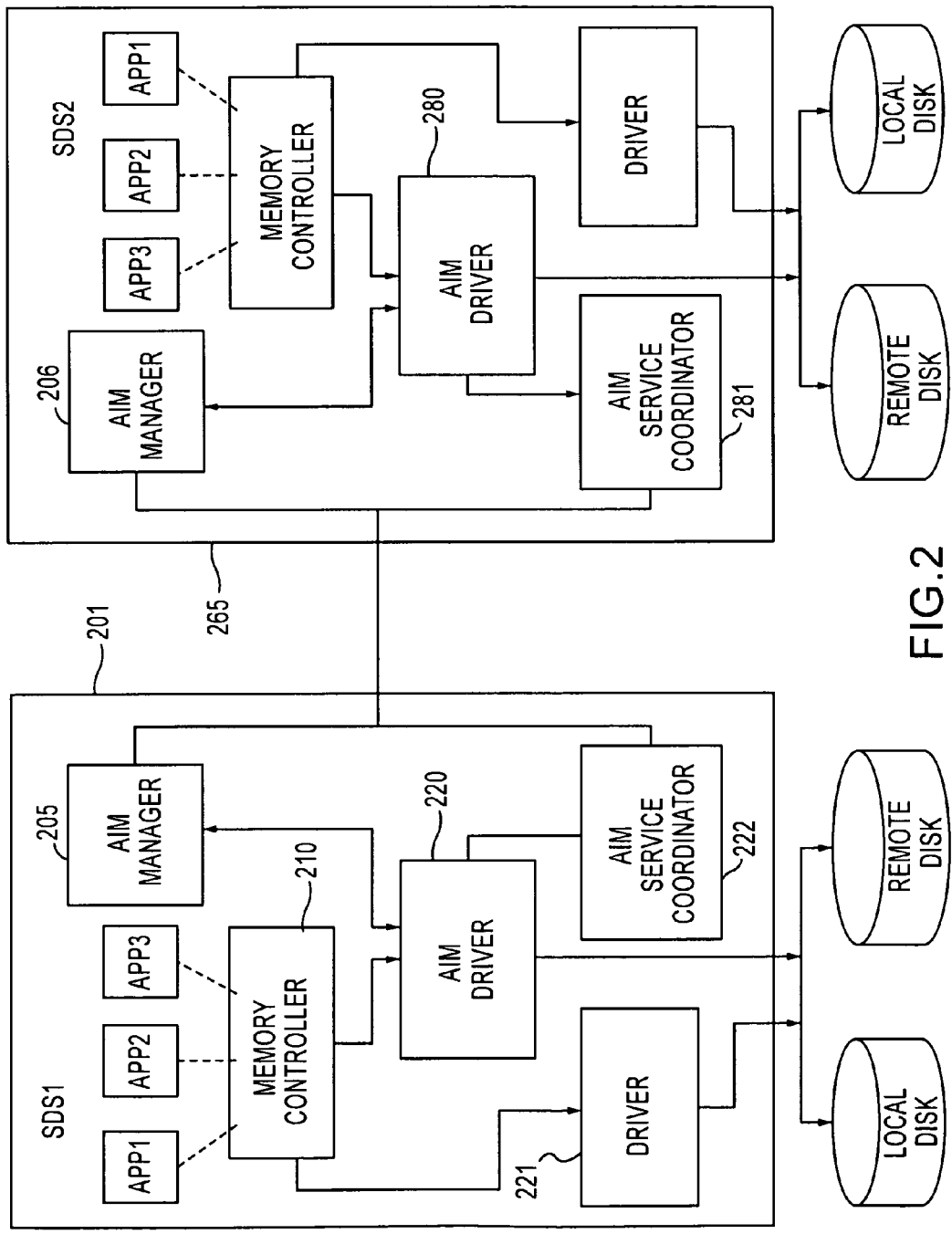
FIG. 2 illustrates a basic peer-to-peer configuration for a preferred embodiment of the present invention where asynchronous mirroring occurs between the local storage system and the remote storage system.

FIG. 2 illustrates a basic configuration for a preferred embodiment of the present invention where asynchronous mirroring occurs between a local storage system (SDS1) and a remote storage system (SDS2). In a preferred embodiment, the SDS1 is implemented on a PC and emulates an I/O controller for managing block I/O operations, a storage driver, and a source storage device. In FIG. 2, the source device 225 is shown as being external to SDS1 and may include any type of storage device such as a hard disk drive, a CD-Rom drive, a flash memory (such as an EEPROM) or the equivalent. SDS1 also preferably includes a destination device 225, such that SDS1 can also operate as a destination storage system for another source storage system (not shown).

In a preferred embodiment, the present invention is installed on the local storage system SDS1 201 and includes the following software components or modules: an AIM driver 220, an AIM service coordinator 277, and an AIM manager 205. Preferably, SDS1 is any PC computer emulating an I/O controller managing block I/O operations, storage drivers 221, and a NIC (network interface CARD) for network access. In a preferred embodiment, the PC computer is running on any type of operating system, such as the Windows Operating System by Microsoft.

As further shown in FIG. 2, a number of applications access the storage controller in order to perform block device read and write operations to and from the local storage device. For example, Application 1 performs I/O transaction A, Application 2 performs I/O transaction B and Application 3 performs I/O transaction C. It is noted that I/O transactions include any kind of write operations performed including file transfer operations, creation of file systems, updating a database, formatting a source device, etc. In short, the mirrored transactions include any transaction that changes the content or organization of the disk or device.

In a preferred embodiment, AIM driver 220 monitors the I/O transactions to the local storage device 225 of SDS1. The AIM driver 220 is installed as an additional component of the operating system and is designed to intercept I/O transactions to the local storage device 225 managed by the operating system and the memory controller 210 at the operating system level. Intercepting all I/O transactions at the operating system level allows the AIM driver 220 to easily identify these write transactions. As the write transactions are identified, copies of these write transactions are made and written to a series of files that are created on the local file-system of the source system SDS1. In a preferred embodiment, the size of the files created to store copies of the write transactions to a destination is user definable and can be varied. Any number of write transactions may be stored in a single file until the file is full (i.e., until it has reached its user-defined size).

In a preferred embodiment of the present invention, SDS1 201 further includes an AIM service coordinator 222, which is a software component that detects the existence of any newly created files on the file system of the source system SDS1.

As these files are created, they are stored in a preselected and identified directory on the local file system and queued for transfer. The AIM coordinator 222 then initiates the configured file transfer system to transmit these files to the remote storage system SDS2 265 on which the software of the present invention is also installed. The file transfer system may be any commercially available file transfer system and may use any known protocol such as TCP/IP or FTP. In a preferred embodiment, the file transfer system that is activated is provided with the address of the destination storage system 265. The activated file transfer system is then instructed by the AIM service coordinator 222 to transfer the newly created files in the specified directory of the local file system to the destination storage system 265. Thus, the content of the file is not important. The file transfer system, given the address to which it must transmit the files, will then find and use the most appropriate network route from the computer to the destination address of the destination storage system.

It is understood that the number of remote storage systems 265 on which the data is to be mirrored is user-selectable and may vary. In a preferred embodiment, the AIM service coordinator 222 transmits the files to any or all pre-specified remote storage systems connected to the local storage system and to which the data is to be mirrored.

In a preferred embodiment, the destination storage system SDS2 265 is also a PC computer with the same AIM software components of the present invention installed on the PC computer (i.e., the AIM service coordinator 281, the AIM manager 206, and the AIM driver 280). After the files are transferred out by the file transfer system on SDS1 201, the AIM service coordinator 281 on the destination storage system SDS2 265 detects the newly arrived AIM files on the file system of the destination storage system SDS2. As explained earlier, and as will be discussed further herein, these files are formatted using a format that includes header information, I/O control information, and the write transactional data. The files are identifiable from other files based upon this format. As the files are received, they are stored in a preselected and identified directory on the file system of the remote storage system and are queued for processing. The AIM manager 206 will monitor the operations of the AIM service coordinator 281 and record the number and size of the AIM files received for keeping performance statistics.

The AIM service coordinator 281 software component of the present invention accesses the files from the file system of the remote storage system, opens the files, reads the copies of the transactions stored in these files, and passes them to the AIM driver 280.

These transactions are then issued to the remote storage device 290 connected to the remote storage system SDS2 265, which is configured to mirror the local storage device 225 on the local storage system SDS1 201. The AIM manager will monitor the operations of the AIM as it is completed for keeping performance statistics. In this way the mirroring can be done asynchronously and a user can determine which transactions have been completed and which remain to be performed for mirroring.

Figure 3A:
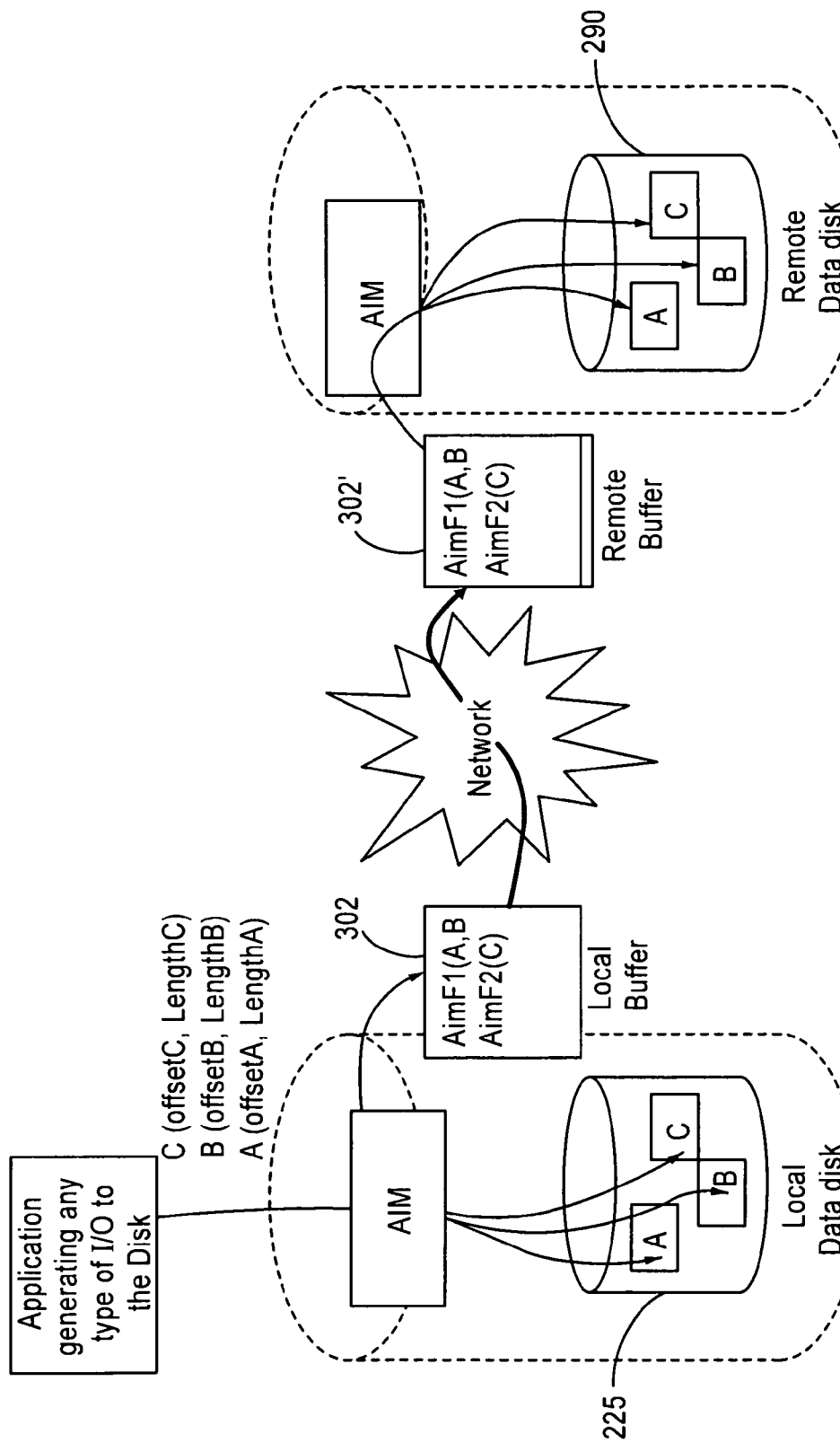
FIG. 3a further illustrates the concepts of encapsulating write transactions into files.

As indicated earlier, I/O transactions to the local storage device 225 are monitored and any kind of transactions involving write operations, formatting, partitioning, etc. at the source device 225 are stored in files. These files have particular formats, which are used to identify them as AIM files after they are transmitted to the remote system. FIG. 3*a* further illustrates the concepts of encapsulating these transactions into files and FIG. 3*b* illustrates the format of these files.

As shown in FIG. 3*a*, assume an application performs a number of transaction A B and C on the source device (where A and B may be simple write operations and C may be a partition operation). These transactions are encapsulated in files AimF1 and AimF2. These files are then stored in the file system on the local storage system and are queued or buffered for transfer to the remote storage system. The I/O can be any type of I/O, for instance: formatting the source data disk, writing to a Word document, updating a database, partitioning the source device.

Figure 3B:
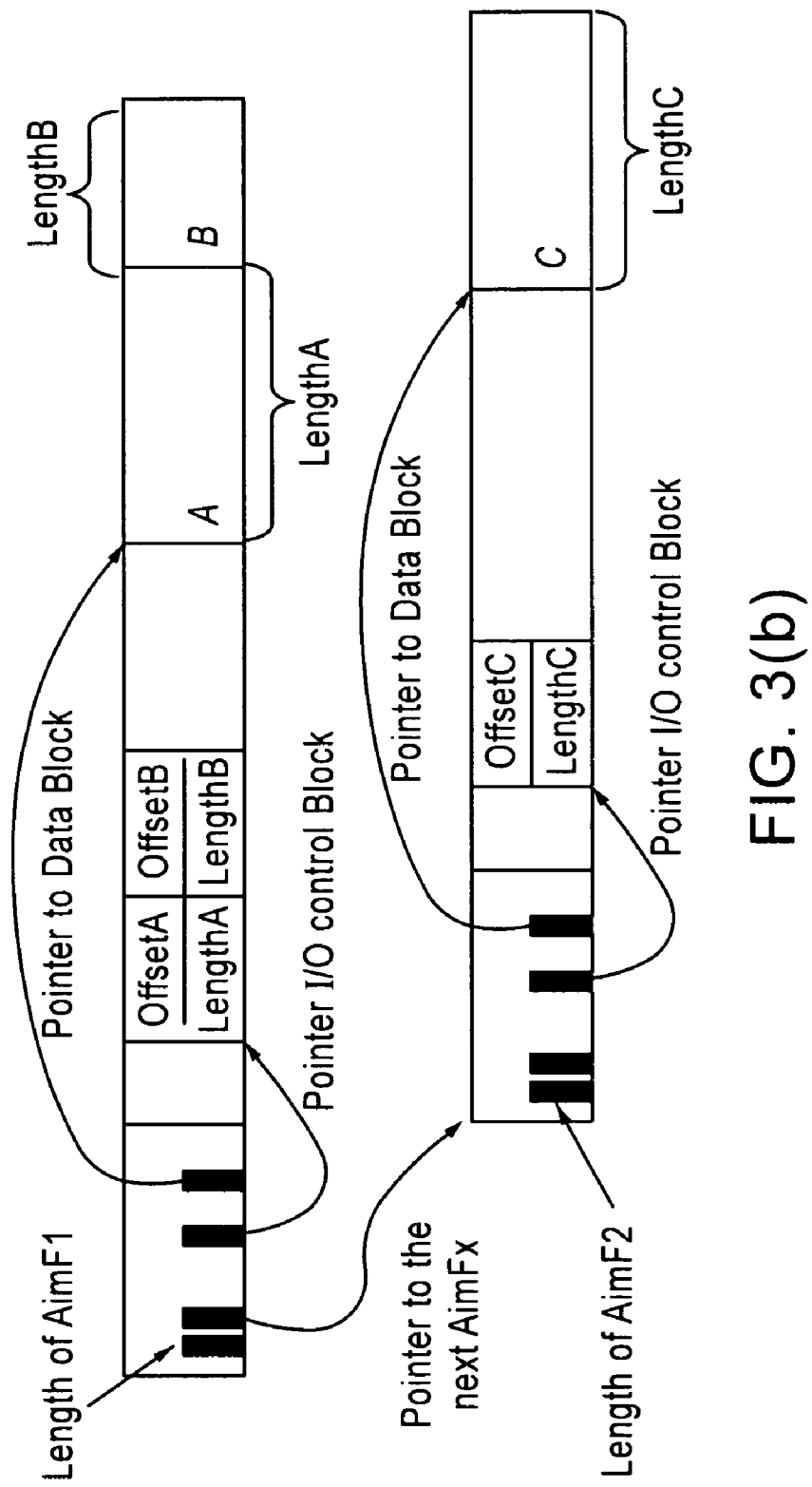
FIG. 3b illustrates a format of AIM files.

FIG. 3*b* shows example formats of AIM files AimF1 and AimF2. As shown, the files have a Header portion, and I/O Control Block portion, and a Data portion.

The Header portion includes information on the total size of AIM file AimF1. It also includes a pointer to the next AIM file in the queue to be transferred, in this case, AIM file AimF2. It further contains a pointer to the I/O Control Block portion, which indicates the offset where the I/O Control Block portion of the file begins. Finally, the header portion includes a pointer to the Data portion, which indicates the offset where the Data portion of the file begins.

The I/O Control Block portion indicates the address offsets where each transaction in the file is to be stored on the destination or source device and a length indicator, which indicates the size of the data for each transaction. Accordingly, since AIM file AimF1 includes transaction A, the I/O Control Block portion includes Offset A/Length A which indicates where the data associated with transaction A is to be stored on the remote destination device and the total length or size of the data to be stored on the remote storage system. Moreover, since AIM files AimF1 also includes transaction B, the I/O Control Block portion also includes Offset B/Length B which indicates where the data associated with transaction B is to be stored on the remote storage device and the total length or size of the data to be stored on the remote storage system.

Finally, the Data portion of the file contains the data for each transaction. Accordingly, as shown, AIM file AimF1 contains a Data portion, which has data for transactions A and B, which are both to be mirrored on the remote storage system.

Figure 4:
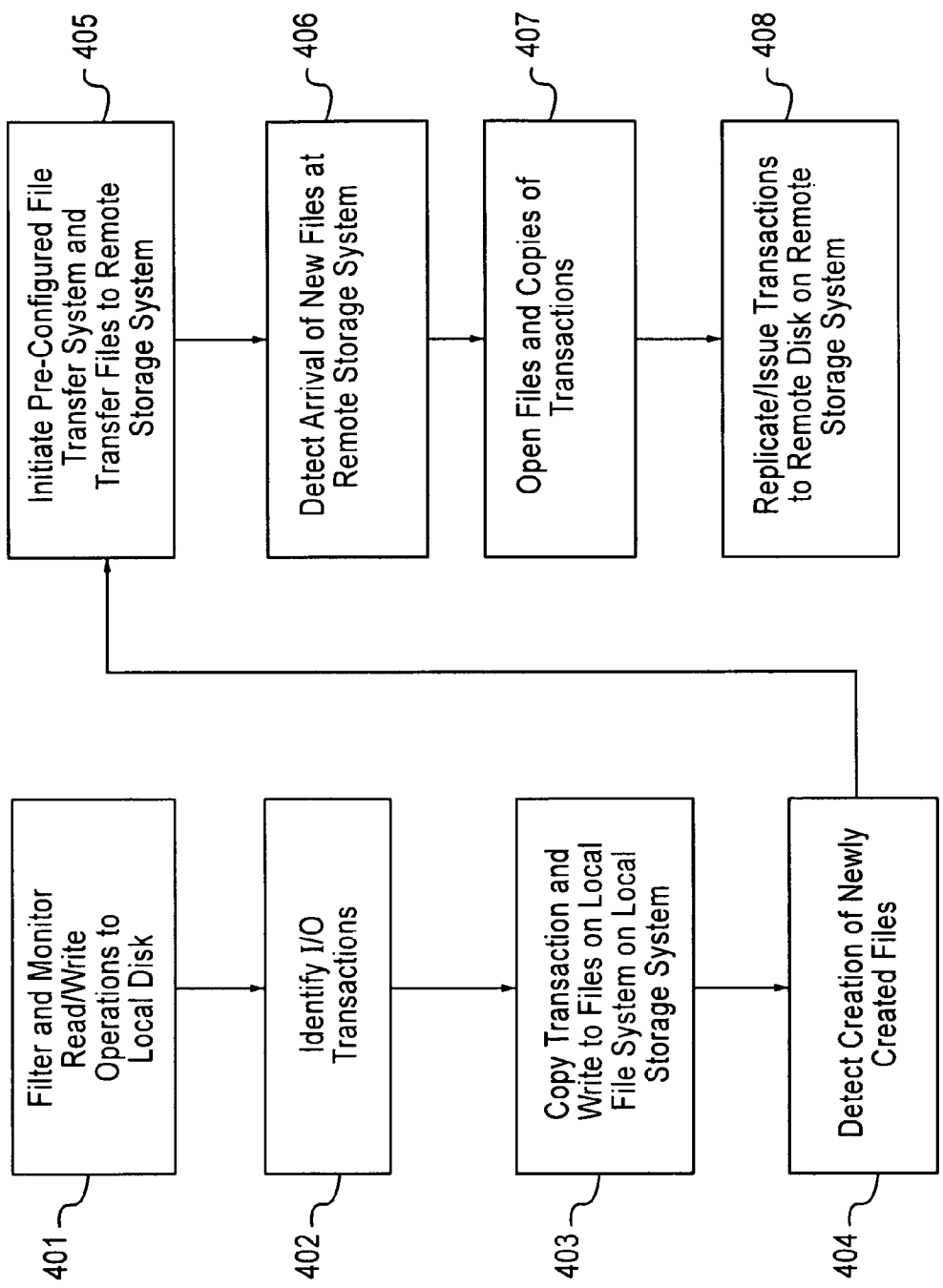
FIG. 4 illustrates a flow chart that shows the steps for mirroring data between a local and remote storage systems in accordance with a preferred embodiment of the present invention.

FIG. 4 is flow diagram showing a preferred embodiment of the process of the present invention. Initially, operations to the source device 225 of a local storage system SDS1, which is to be mirrored on a remote storage system 265 some geographical distance away, are monitored 401. All I/O transactions to a source device 225 at the local storage system are intercepted and write transactions are identified 402. In some embodiments, formatting, partitioning, etc. transactions are also intercepted. A copy of these transactions is made and written to a series of files 302 that are created on a file-system of the local storage system SDS1 403. In a preferred embodiment, the size of the files created to store copies of the write transactions is user definable and can be varied. Any number of transactions may be stored in a single file until the file is full (i.e., until it has reached its user-defined size). The files are formatted using a format, which includes header information, I/O control information, and transactional data. The files are identifiable from other files based upon this proprietary format.

As transactions are copied and new files are created, the creation of these newly created files on the file system of the local storage system SDS1 is detected 404. A file transfer system is invoked to transmit these newly created files to the destination storage system SDS2 on which the data is to be mirrored 405. As these files are created, they are stored in a preselected and identified directory on the local file system and queued for transfer. The AIM service coordinator 222 invokes the file transfer system to transmit these files to the remote storage system SDS2 on which the software of the present invention is also installed. The file transfer system may be any commercially available file transfer system and may use any known protocol such as FTP.

In a preferred embodiment, the file transfer system that is activated is provided with the address or location of the destination storage system. The file transfer system is then instructed by the AIM coordinator to transfer all the newly created files it finds in the specified directory of the local file system to the destination storage system. In a preferred embodiment, the file transfer system is provided with the IP address of the destination storage system. The file transfer system is then instructed to transfer all the newly created files it finds in the folder/directory specified. In this way the content of the file (i.e. the format of the data) is irrelevant to the file transfer system. The file transfer system, given the address to which it must transmit the files, will then find and use the most appropriate network route from the computer to the destination address of the remote storage system.

At the remote storage system SDS2, the arrival of the files is detected 406. The files are then opened and the copies the Write (or other types of) transactions in these files are read and passed along to a driver 407. These transactions are then replicated or issued by the AIM service coordinator to the remote storage device connected to the remote storage system SDS2 which is configured to mirror the local storage device on the local storage system SDS1 408.

Figure 5:
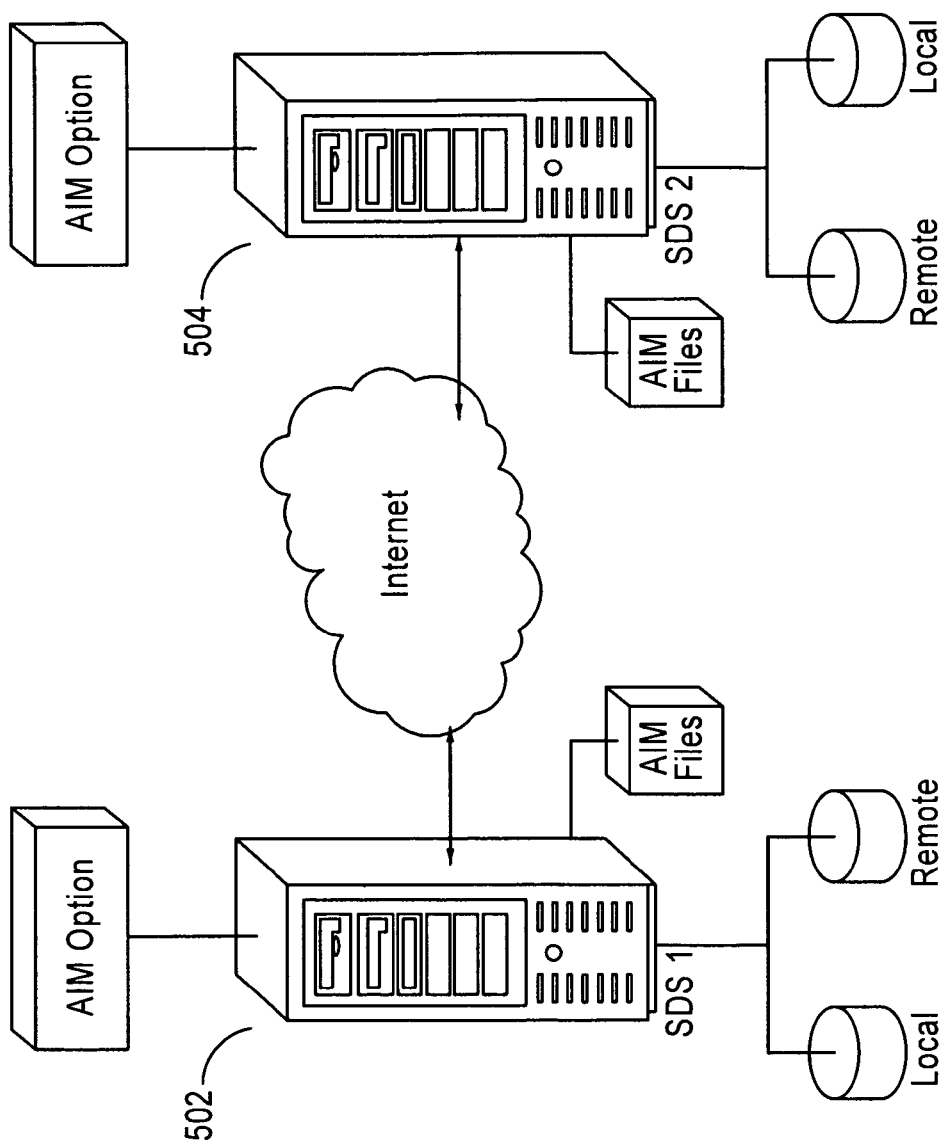
FIG. 5 illustrates a peer-to-peer SDS bi-directional AIM configuration.

FIG. 5 illustrates a peer-to-peer SDS bi-directional AIM configuration in which the AIM system of the present invention is used in both SDS1 and SDS 2, and each serves as the source and destination to each other. Accordingly, the AIM software components are designed to function in a bi-directional manner. This configuration applies when the data 502, 504 on two sites are mutually shared. Both systems are actively running applications that generate unique data that are transferred to a remote site using AIM services and standard protocols.

Figure 6:
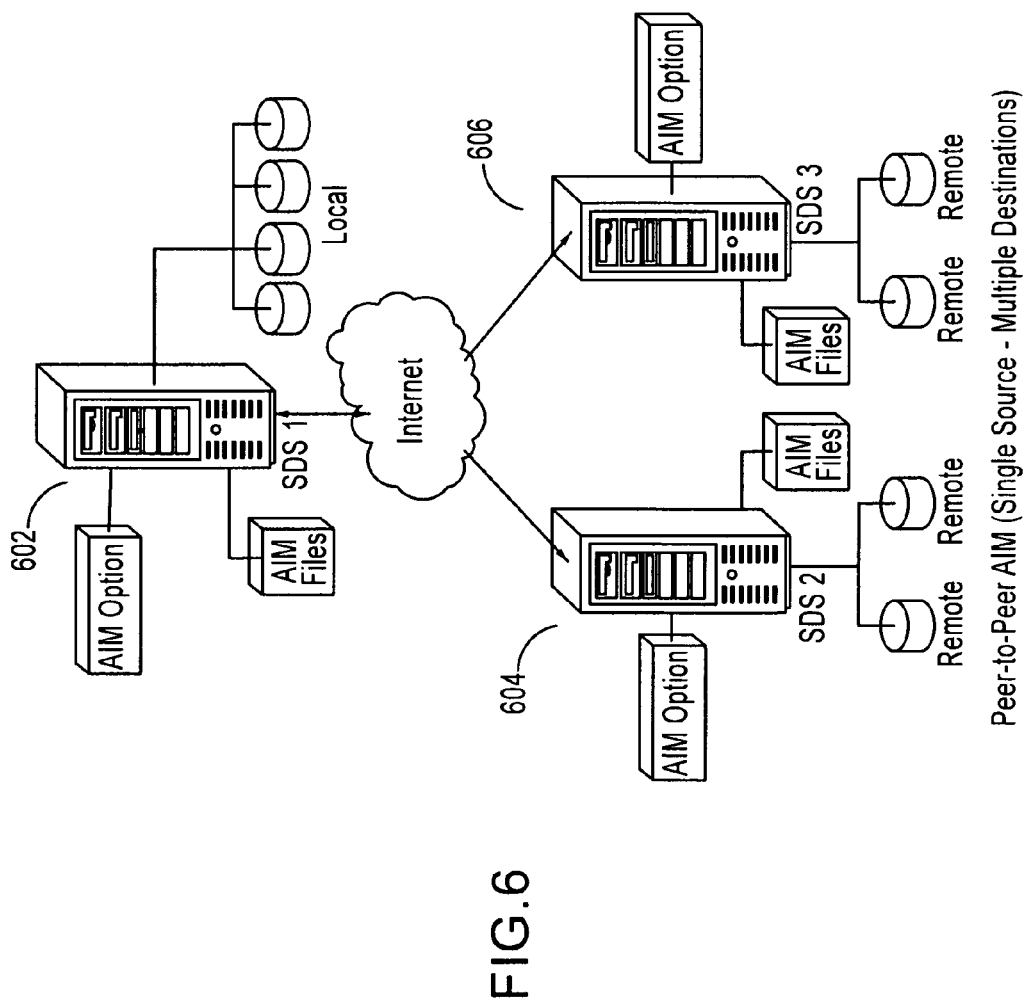
FIG. 6 illustrates a single source to multiple-destination AIM configuration.

FIG. 6 illustrates a single source to multiple-destination AIM configuration. It is formed of a single local storage system SDS1 602 and at least two remote storage systems SDS2 604 and SDS3 606. The AIM software running on SDS1 mirrors its local storage devices to the two different remote systems (SD 2 and SDS3) that are located in different geographic locations in accordance with the same techniques as described for the single source/destination embodiment shown in FIG. 2. An example of how this kind of configuration would be used is a corporate data center that shares some of its data with the regional branches of the corporation.

Figure 7:
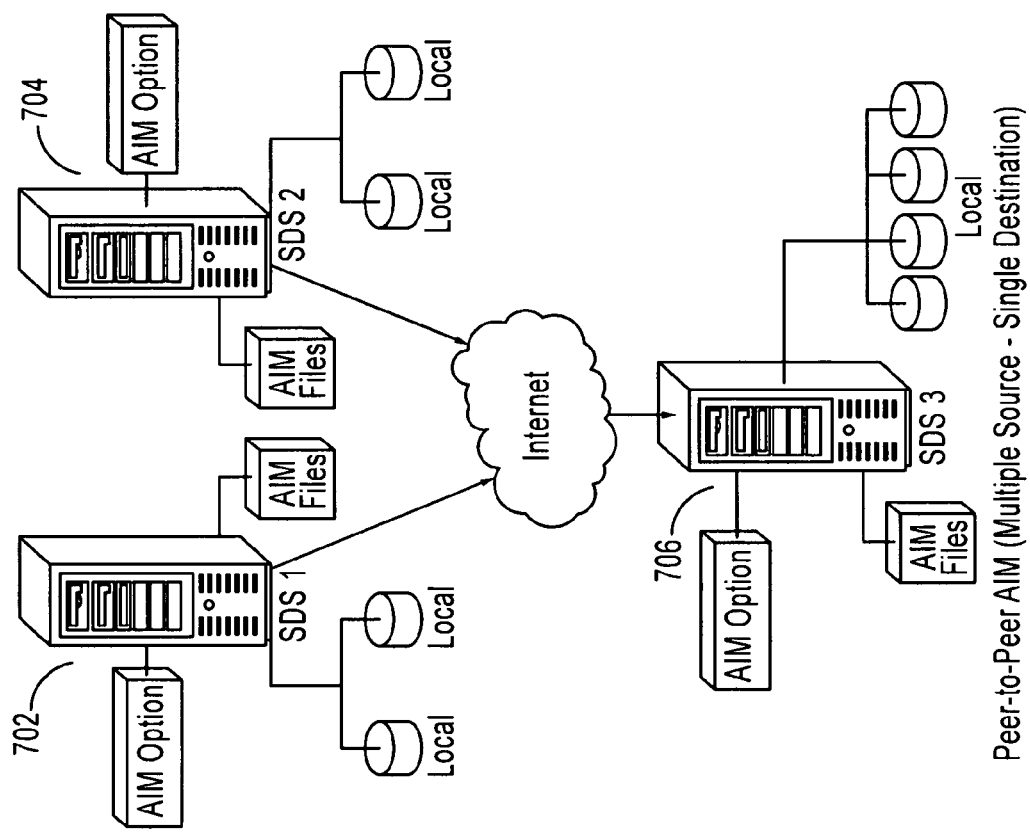
FIG. 7 illustrates a multiple source to a single destination AIM configuration.

FIG. 7 illustrates an alternative system in which the present invention may be used. The system of FIG. 7 includes at least two local storage systems SDS1 702 and SDS2 704, which both have their contents mirrored to a single remote storage system SDS3 706. In the system illustrated in FIG. 7, the AIM software of the present invention is configured and running on both local storage systems (SDS1 and SDS 2). The two source systems SDS1 and SDS2 mirror all write (and other) operations to their local storage devices to a remote disk drive located in a remote data center SDS3. This all occurs using the same AIM services as described in previous paragraphs. For example, an inventory change in a corporation's regional offices is asynchronously mirrored in the corporate management center.

Figure 8:
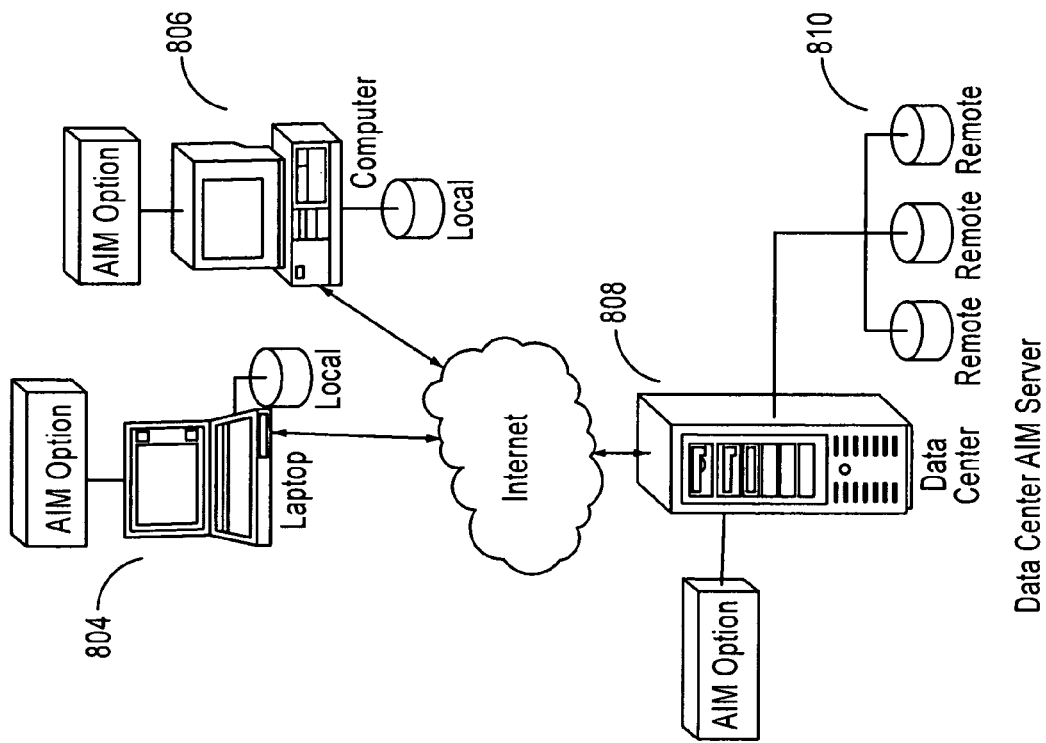
FIG. 8 is a unique configuration using AIM technology to asynchronously mirror data located on various devices.

FIG. 8 is a unique configuration using AIM technology to asynchronously mirror data located on Laptops, Home PC's or local workstations to a universal data center. In the configuration illustrated in FIG. 8, the AIM software of the present invention is installed on a server located in a data center 808. The data center includes a series of storage devices 810 which are used to asynchronously mirror the data modified on any of the individual computers such as the laptop 804 and computer 806. Accordingly, in the embodiment illustrated in FIG. 8, when a user is traveling with a laptop 804 or at home using a computer 806, the local data changes he makes to the local storage drive installed at the individual computers will be duplicated and stored in AIM files in accordance with the techniques described in previous paragraphs. Then, when the computer 806 or laptop 804 is actively connected to the Internet, via a modem or a LAN connection, all the data that has changed since the last connection is automatically transferred to the server located in a data center. The server in the data center uses the AIM software to read the incoming files and updates the server's disks configured to be mirrors of the storage device at the local storage system (i.e., laptop, desktop).

AIM mirroring enables remote data synchronization for a broader range of computer end-users than current solutions for several reasons: 1. Hardware and Storage vendor independence. Today, customers are forced to buy very expensive and proprietary specialized equipment from vendors in order to effect geographically distant data mirroring. Using AIM implements data availability for the entire spectrum of computer users. 2. Transportation independent. AIM will run over any network link from single 56K modem line connected to the Internet to a dedicated hi-bandwidth WAN connection. The only difference is defined by the coherency 'time-lag.' The size of the coherency 'time-lag' can be adjusted transparently by providing more bandwidth without requiring additional hardware for the AIM connected computers. Because AIM is asynchronous, the local computer does not have to wait for an acknowledgement from the remote computer. 3. Resilience. Because the files are stored on the file system of the local storage system and queued for transfer, the link can go down for days without forcing an expensive mirror rebuild operation.

AIM mirroring opens up possibilities for data generation, distribution and manipulation that previously were price prohibitive. Its applications are endless, possibilities include: Maintaining remote copies of critical data for backup & archiving purposes Content distribution & replication to remote sites The applicability of this capability can be integrated into all areas where data is generated and stored on a computer. Its benefits can be realized by all computer uses. It is an idea that will revolutionize the way data is stored, much like the Internet has changed the way we communicate and work. Ironically, it is this Internet world that further reinforces the need for AIM.

The above description is intended to illustrate the operation of the preferred embodiments of the present invention and is not meant to limit the scope of the invention. From the above discussion, many variations will be apparent to one skilled in the art that would yet be encompassed by the spirit and scope of the invention.

What is claimed is:

1. A system for mirroring write operations from a local non-transitory computer readable storage system onto a remote storage system, the system comprising:
    an asynchronous mirroring driver resident in the local storage system for intercepting I/O transactions to a storage disk of the local storage system, identifying a series of write transactions issued to said storage disk, making an exact copy of the series of write transactions, and storing said exact copy within a series of files that are created on a file-system of the local storage system; and
    a first asynchronous mirroring coordinator resident on the local storage system for invoking a file transfer system to transmit the series of files on the local file-system of the local storage system to a file system of the remote storage system to accommodate an exact reproduction at the remote storage system of the series of write transactions as issued to said storage disk of the local storage system.

2. The system claim 1, further comprising:
    a second asynchronous mirroring coordinator resident on the remote storage system for detecting the series of files on the file system of the remote storage system, opening the files and reading the exact copy of the series of write transactions in these files; and
    an asynchronous mirroring driver resident on the remote storage system for receiving the exact copy of the series of write transactions from the second asynchronous mirroring coordinator and issuing the transactions to a remote device connected to the remote storage system which is configured to mirror the local storage device on the local storage system.

3. The system of claim 1, wherein the asynchronous mirroring driver intercepts all I/O transactions in the system.

4. The system of claim 1, wherein the series of write transactions is one of a plurality of series of I/O transactions that are respectively retained in corresponding ones of the series of files, and individual ones of the series of files include pointers to accommodate sequencing the series of files, whereby a transaction level record of changes to the storage disk of the local storage system is provided for the remote storage system.

5. The system of claim 4, wherein the plurality of series of I/O transactions include at least one formatting transaction and/or at least one partitioning transaction.

6. A method for mirroring write operations from a local storage system to a remote storage system, the method comprising:
    intercepting I/O transactions to a storage disk of the local storage system;
    identifying a series of write transactions to said storage disk from the intercepted I/O transactions;
    storing an exact copy of the series of write transactions within a series of files that are created on a file-system of the local storage system; and
    transmitting the series of files from the local storage system to the remote storage system to accommodate a reproduction at the remote storage system of the series of write transactions as issued to said storage disk of the local storage system.

7. The method of claim 6, further comprising:
    passing the series of write transactions to a driver issuing the transactions to storage device of the remote storage system, which is configured to mirror the storage device on the local storage system.

8. The method of claim 6, wherein intercepting I/P transactions comprises intercepting all I/O transactions in the system.

9. The method of claim 6, wherein the series of write transactions is one of a plurality of series of I/O transactions that are respectively retained in corresponding ones of the series of files, and individual ones of the series of files include pointers to accommodate sequencing the series of files, whereby a transaction level record of changes to the storage disk of the local storage system is provided for the remote storage system.

10. The method of claim 9, wherein the plurality of series of I/O transactions include at least one formatting transaction and/or at least one partitioning transaction.

11. A computer program product for mirroring write operations from a local storage system to a remote storage system, the computer program product comprising program code stored on a non-transitory computer readable medium, the program code being executable to perform operations comprising:
- intercepting I/O transactions to a storage disk of the local storage system;
- identifying a series of write transactions to said storage disk from the intercepted I/O transactions;
- storing an exact copy of the series of write transactions within a series of files that are created on a file-system of the local storage system; and
- transmitting the series of files from the local storage system to the remote storage system to accommodate a reproduction at the remote storage system of the series of write transactions as issued to said storage disk of the local storage system.

12. The computer program product of claim 11, wherein the operations further comprise:
- passing the series of write transactions to a driver issuing the transactions to storage device of the remote storage system, which is configured to mirror the storage device on the local storage system.

13. The computer program product of claim 11, wherein intercepting I/O transactions comprises intercepting all I/O transactions in the system.

14. The computer program product of claim 11, wherein the series of write transactions is one of a plurality of series of I/O transactions that are respectively retained in corresponding ones of the series of files, and individual ones of the series of files include pointers to accommodate sequencing the series of files, whereby a transaction level record of changes to the storage disk of the local storage system is provided for the remote storage system.

15. The computer program product of claim 14, wherein the plurality of series of I/O transactions include at least one formatting transaction and/or at least one partitioning transaction.

16. A method for mirroring write operations from a local storage system to a remote storage system, the method comprising:
- intercepting I/O transactions to a storage disk of the local storage system;
- identifying a series of write transactions to said storage disk from the intercepted I/O transactions;
- storing an exact copy of the series of write transactions within a series of files; and
- storing the series of files at the local storage system and/or the remote storage system;
- wherein the series of write transactions is one of a plurality of series of write transactions that are respectively retained in corresponding ones of the series of files, and individual ones of the series of files include pointers to accommodate sequencing the series of files, whereby an indexed transaction level record of changes to the storage disk of the local storage system is retained.

17. A computer program product for mirroring write operations from a local storage system to a remote storage system, the computer program product comprising program code stored on a non-transitory computer readable medium, the program code being executable to perform operations comprising:
- intercepting I/O transactions to a storage disk of the local storage system;
- identifying a series of write transactions to said storage disk from the intercepted I/O transactions;
- storing an exact copy of the series of write transactions within a series of files; and
- storing the series of files at the local storage system and/or the remote storage system;
- wherein the series of write transactions is one of a plurality of series of write transactions that are respectively retained in corresponding ones of the series of files, and individual ones of the series of files include pointers to accommodate sequencing the series of files, whereby an indexed transaction level record of changes to the storage disk of the local storage system is retained.

* * * * *